Nov. 13, 1923.

T. LENNARD

REAMING TOOL 1,474,197

Filed July 23, 1921

Inventor.
Thomas Lennard

Patented Nov. 13, 1923.

1,474,197

UNITED STATES PATENT OFFICE.

THOMAS LENNARD, OF TORONTO, ONTARIO, CANADA.

REAMING TOOL.

Application filed July 23, 1921. Serial No. 487,064.

*To all whom it may concern:*

Be it known that I, THOMAS LENNARD, a subject of the King of Great Britain, and resident of the city of Toronto, county of York, Province of Ontario, in the Dominion of Canada, have invented certain new and useful Improvements in Reaming Tools, described in the following specification and illustrated in the accompanying drawings, that form part of the same.

The principal objects of the invention are to facilitate the work of truing up engine cylinders after they become worn, and to enable such work being accomplished without the use of machinery such as the grinding machines that are at present used for such purposes.

A further object is to provide a very strong and durable tool which may be adjusted very accurately to make the desired cut.

The principal feature of the invention consists in the novel construction of a reaming tool whereby a plurality of cutters are slidably arranged in convergent guideways and said cutters are moved uniformly longitudinally to obtain the uniform radial expansion of the cutting edges, and whereby an adjustable pilot is arranged to guide the cutters truly into the cylinder.

In the drawings, Figure 1 is an elevational view of my improved form of reamer.

Figures 1, 2, 3, 4:
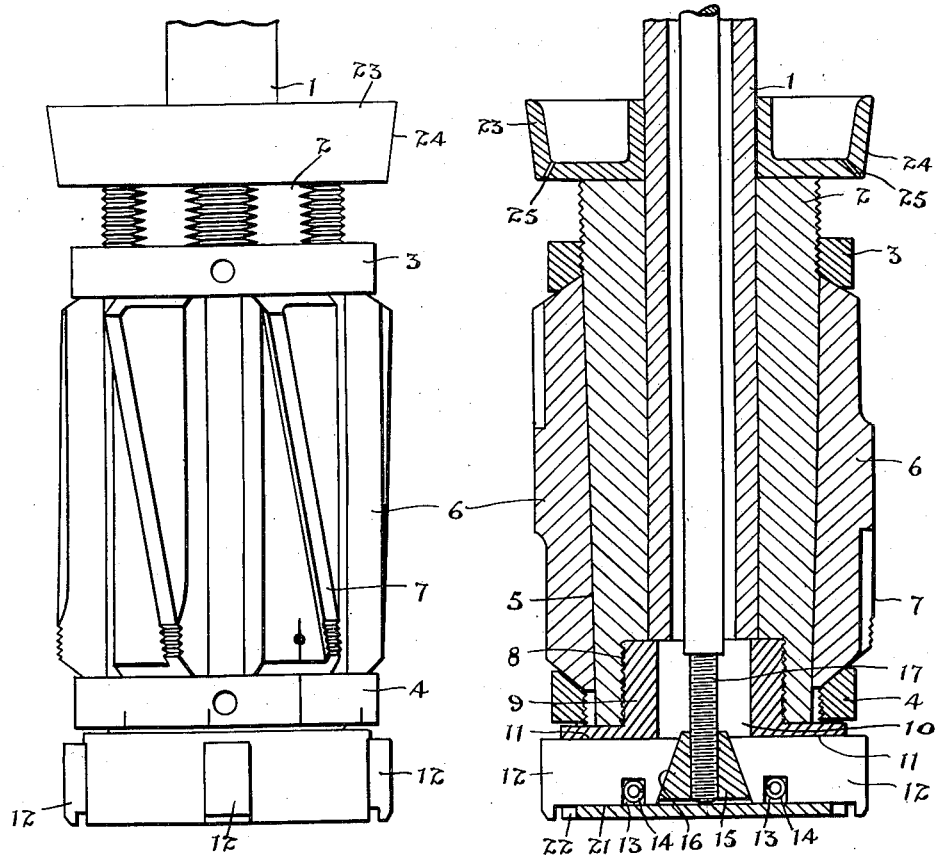
Figure 2 is a longitudinal mid-sectional view.
Figure 3 is a cross sectional view mid-way of the length of the cutters.
Figure 4 is a cross sectional detail through the pilot holding member, taken between the movable pilot members.

In the construction herein shown the stem 1 of the reamer is of tubular form and upon this stem is rigidly secured in any suitable manner, a cylindrical block 2. The upper and lower ends of the block are threaded to receive the adjusting collars 3 and 4 respectively.

Longitudinally arranged grooves 5 are cut in the periphery of the block 2, said grooves tapering toward one end of the block and in these grooves are slidably mounted a plurality of cutter blocks 6 each having a tapered inner surface corresponding with the taper of the grooves 5 so that when moved longitudinally in the said grooves, the outer cutter surfaces will move parallel to the axis of the stem. The outer face of the cutters is formed with the diagonally arranged cutter edge 7 which at the entering end of the tool is formed with cutting screw threads which assist the work by gripping the surface which is to be reamed and drawing the reamer inwardly.

The lower adjusting collar 4 is marked with suitable graduations to coincide with a zero mark on one of the cutters so that the adjustment of the cutters may be very accurately regulated, it being merely necessary to loosen the upper collar and then turn the lower collar to the desired position in order to move the cutters longitudinally in their grooves to give the required diameter.

This action is of course where the cutter is being expanded and it may of course be contracted by loosening the lower collar and tightening the upper one, but the graduations are only required on the one collar.

The pitch of the thread for the collar 4 is relative to the bevel of the cutter guides so that a positive relation exists which will accomplish a micrometer adjustment.

The lower end of the block 2 is formed with a countersunk threaded orifice 8 into which is secured the block 9 which is provided with a single cylindrical orifice 10 and a plurality of radial orifices 11. Within these radial orifices are arranged a plurality of slidable blocks 12 which are adapted to be projected outwardly to engage the side walls of the opening which is to be reamed to form a pilot for the cutter.

Each of the blocks 12 is provided with a notch 13 to receive a coil spring 14 which is arranged in the form of a circle and is adapted to draw the pilot blocks inwardly. The adjustment of these pilot blocks is regulated by a cone 15 which fits the bevelled inner ends 16 of the pilot blocks, said cone being threaded upon a stem 17 centrally supported within the hollow stem 1. The upper end 18 of the stem 17 is of a reduced diameter and is journalled in a block 19 secured in the stem 1. A knurled thumb nut 20 is secured to the outer end of the stem 17 to enable it to be rotated to effect the adjustment of the cone 15.

The lower end of the tool is closed by a plate 21 secured in the counter-sunk recess 22 in the end of the plug 9.

An upper pilot is formed by a cup-shaped member 23 which encircles the stem 1 in a sliding fit. The outer wall 24 of this pilot is tapered so that it will enter the reamed hole and guide the stem at the top true with the hole. This member 23 is cup-shaped to hold a lubricating oil which is directed onto the cutters through holes 25 in the bottom.

A tool such as described is extremely compact and in its use the cutters are first set to the desired diameter according to the requirements of the job to be done. The pilot end is then inserted and by manipulating the thumb nut 20 the pilot blocks are moved to engage the walls of the hole to be reamed and as the reamer is turned, the tap threads first cut into the metal and they are followed by the spirally disposed cutting edges. The metal is thus cut away to any desired thickness and a very effective job is produced.

The adjustment is very simple and the tool is extremely strong and capable of withstanding heavy duty and its use will enable the ordinary garage repair man to effect the re-boring of engine cylinders without the use of a power machine.

What I claim as my invention is:—

1. In a reamer, the combination with a block having longitudinal grooves and radially adjustable cutters arranged therein, of radial guides arranged at the inner end of said block, blocks slidable in said radial guides, a tubular stem rigidly secured in the reamer block, a stem extending through said tubular stem to the outer end thereof, and means connected to the inner end of said central stem for operating said slidable blocks.

2. In a reamer, the combination with a block having longitudinal grooves and radially adjustable cutters arranged therein, of radial guides having bevelled inner ends, a tubular stem secured in the cutter block, a stem rotatably mounted in said tubular stem having a threaded inner end, a threaded cone mounted on the threaded inner end of said central stem engaging the bevelled surfaces of said radial blocks, and means secured to the outer end of said stem for rotating same.

THOMAS LENNARD.